United States Patent [19]

Kuwana et al.

[11] Patent Number: 5,064,253
[45] Date of Patent: Nov. 12, 1991

[54] ANTI-SKID CONTROLLING APPARATUS

[75] Inventors: Kazutaka Kuwana; Tsuyoshi Yoshida; Hiroyuki Ichikawa; Kenji Tozu, all of Aichi, Japan

[73] Assignee: Aisin Seiki K.K., Aichi, Japan

[21] Appl. No.: 590,701

[22] Filed: Sep. 28, 1990

[30] Foreign Application Priority Data

Sep. 30, 1989 [JP] Japan .................................. 1-256848

[51] Int. Cl.⁵ ................................................ B60T 8/70
[52] U.S. Cl. ..................................... 303/106; 303/97; 303/109; 364/426.02
[58] Field of Search ....................... 303/91, 95, 96, 97, 303/99, 100, 102, 103, 105, 106, 107, 108, 109; 364/426.01, 426.02; 188/181 A, 181 C

[56] References Cited

U.S. PATENT DOCUMENTS 4,637,663  1/1987  Matsuda .............................. 303/106
4,662,686  5/1987  Matsuda .............................. 303/106

Primary Examiner—Douglas C. Butler
Attorney, Agent, or Firm—Sughrue, Mion, Zinn, Macpeak & Seas

[57] ABSTRACT

An anti-skid controlling apparatus which establishes the time allocation for the pressure decreasing time and decreased pressure holding time, as well as the time allocation for the pressure increasing time and increased pressure holding time, in accordance with the correlation between wheel acceleration and wheel lock level. The brake fluid pressure in the wheel cylinder is increased, held constant or decreased as needed. This makes it possible to establish optimal time allocation settings allowing for the pressure increasing and decreasing characteristics of the pressure controlling device. In turn, brake fluid pressure control is kept optimally provided independent of various factors that would affect the brake fluid pressure in the wheel cylinder. Thus the apparatus is suitable for use on board diverse kinds of vehicle with diverse characteristics.

3 Claims, 15 Drawing Sheets

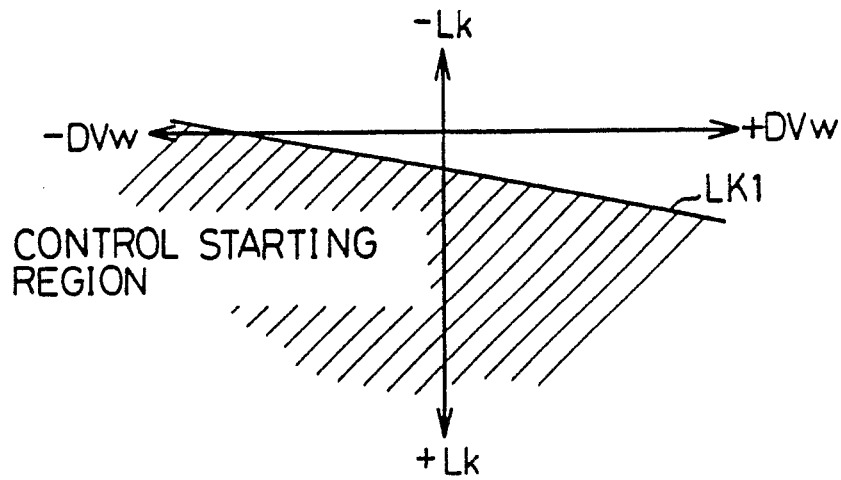
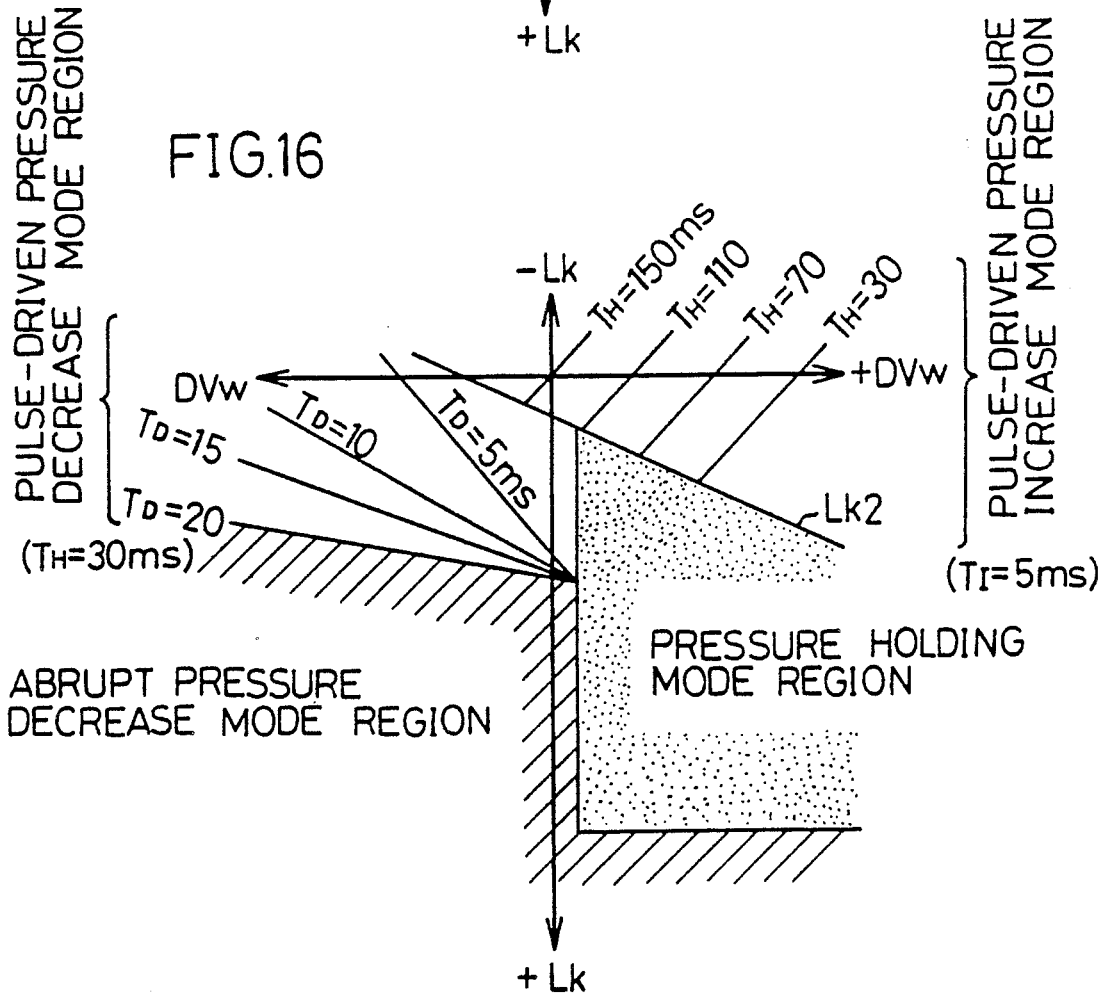

ANTI-SKID CONTROLLING APPARATUS

BACKGROUND OF THE INVENTION

1. Field of the Invention

The present invention relates to an anti-skid controlling apparatus which controls the braking force applied to the wheels of a vehicle so that the wheels are not locked when braked.

2. Description of the Prior Art

When a running vehicle is abruptly braked and its wheels are locked thereby, the vehicle's purchase on the road surface may become unstable depending on the road surface condition. To prevent the wheels from getting locked in such a situation, the anti-skid controlling apparatus has been conventionally used on board the vehicle. The controlling apparatus controls the brake fluid pressure in the wheel cylinders attached to the wheels so as to optimally decrease or increase the braking force applied to the wheels.

As the brake fluid pressure in the wheel cylinders is raised, the wheel velocity abruptly drops just before the friction coefficient $\mu$ of the wheels reaches its maximum. This characteristic is utilized by prior art anti-skid controlling apparatus that control the brake fluid pressure in keeping with changes in the wheel velocity and wheel acceleration. The braking force is controlled in this manner so that the slip ratio of the wheels settles at around 20% where a maximum friction coefficient is acquired.

The representative prior art anti-skid controlling apparatus works as follows. The rotating speed of each of the wheels, i.e., the wheel velocity, is first detected. The vehicle velocity is deducted from the wheel velocity. In turn, the vehicle velocity is used to obtain a reference velocity for comparison with the velocity of the individual wheels. The result of the comparison is used to control the brake fluid pressure in the wheel cylinder of each wheel. Japanese Patent Laid-open No. 64-52568 discloses one such anti-skid controlling apparatus. This apparatus distinguishes a "pressure decreasing region" from a "pressure increasing region" in its pressure control setup depending on the slip ratio and wheel acceleration of the vehicle on which it is mounted, each region being variable as required. The disclosure also includes an apparatus capable of lowering the memory size required for skid control.

One disadvantages of the prior art above is that simply separating the pressure decreasing region from the pressure increasing region fails to address the diverse control conditions that vary depending on many factors: different pressure changing characteristics of the pressure controlling means for controlling the brake fluid pressure on different vehicles; different tires; different characteristics of the braking system as a whole from vehicle to vehicle; and different friction coefficients relative to different road surfaces. The above Japanese Patent Laid-open No. 64-52568 discloses that in order to control brake fluid pressure decreases, the pressure decreasing action and pressure holding action are alternated by pulse-based pressure decreasing controls. In this setup, the ratio of pressure decreasing time to pressure holding time is predetermined for the pressure decreasing region. This results in another disadvantage: predestined difficulty in flexibly achieving optimal pressure control.

SUMMARY OF THE INVENTION

It is therefore an object of the present invention to provide an anti-skid controlling apparatus which provides optimal brake fluid control over the wheel cylinders without being affected by the above-mentioned various characteristic differences with different vehicles.

In achieving the foregoing and other objects of the present invention and according to a first aspect thereof, there is provided an anti-skid controlling apparatus comprising, as shown in FIG. 1, a wheel cylinder 51 which is attached to a front-right (FR) wheel (representing all wheels of the vehicle) and which applies a braking force thereto; a wheel velocity detecting means M1 for detecting a wheel velocity of the FR wheel; a wheel acceleration computing means M2 for computing a wheel acceleration based on the wheel velocity detected by the wheel velocity detecting means; an estimated vehicle velocity determining means M3 for determining an estimated vehicle velocity based on the wheel velocity; a wheel lock level determining means M4 for determining a level of wheel lock based on the estimated vehicle velocity and on the wheel velocity; a control allocation determining means M5 for determining one kind of time allocation for a pressure increasing time and an increased pressure holding time, as well as another kind of time allocation for a pressure decreasing time and a decreased pressure holding time, the pressure increasing time being a period of time in which the brake fluid pressure in the wheel cylinder means is increased, the increased pressure holding time being a period of time in which the increased brake fluid pressure is maintained, the pressure decreasing time being a period of time in which the brake fluid pressure is decreased, the decreased pressure holding time being a period of time in which the decreased brake fluid pressure is maintained, the time allocation being based on the correlation between the wheel acceleration and the wheel lock level; and a pressure controlling means M6 for controlling over time at least one of the increasing, holding and decreasing of the brake fluid pressure based on the time allocation for the pressure increasing time and the increased pressure holding time as well as on the time allocation for the pressure decreasing time and the decreased pressure holding time.

According to a second aspect of the present invention, there is provided an anti-skid controlling apparatus further comprising a slip ratio computing means for computing the slip ratio of each of the wheels based on the estimated vehicle velocity and the wheel velocity, and a wheel velocity deviation computing means for computing a discrepancy in velocity between the estimated vehicle velocity and the wheel velocity, wherein the wheel lock level determining means M4 determines the wheel lock level based at least on one of the slip ratio and the velocity discrepancy.

According to a third aspect of the present invention, there is provided an anti-skid controlling apparatus wherein the wheel lock level determining means M4 determines the wheel lock level by individually weighting the slip ratio and the velocity discrepancy and by adding up the weighted slip ratio and weighted velocity discrepancy.

In the above-described anti-skid controlling apparatus, the wheel velocity detecting means M1 detects the rotating speed of the FR wheel, i.e., the wheel velocity. Based on the wheel velocity, the wheel acceleration computing means M2 computes a wheel acceleration. The wheel velocity is also used by the estimated vehicle velocity determining means M3 to establish an estimated vehicle velocity. Any other wheel than the FR wheel may be utilized to detect the wheel velocity thereof which in turn may be used to compute the estimated vehicle velocity for each wheel.

The wheel lock level detecting means M4 determines the level of wheel lock based on the estimated vehicle velocity and the wheel velocity determined above. The wheel lock level provides an indication of how much the FR wheel is being locked. The wheel lock level is determined based at least on one of the slip ratio and the discrepancy between estimated vehicle velocity and wheel velocity. The wheel lock level and the wheel acceleration vary with different braking systems of different vehicles and with different friction coefficients regarding different road surfaces.

Based on the correlation between wheel acceleration and wheel lock level, the control allocation determining means M5 allocates the fluid pressure increasing time and increased pressure holding time. The pressure increasing time is a period of time in which the brake fluid pressure in the wheel cylinder 51 is increased. The increased pressure holding time is a period of time in which the increased brake fluid pressure is maintained. The control allocation determining means M5 likewise allocates the pressure decreasing time in which the above brake fluid pressure is decreased, and the decreased pressure holding time in which the decreased brake fluid pressure is maintained.

In accordance with the time allocation established above, the brake fluid pressure is increased, maintained or decreased so that an optimal braking force is applied smoothly to the FR wheel without causing the wheel to be locked.

BRIEF DESCRIPTION OF THE DRAWINGS

FIG. 15 is a graphic representation showing the control start condition for the second embodiment; and FIG. 16 is a graphic representation illustrating the control mode regions to be established with the second embodiment depending on wheel acceleration and wheel lock level.

DESCRIPTION OF THE PREFERRED EMBODIMENT

Figure 1:
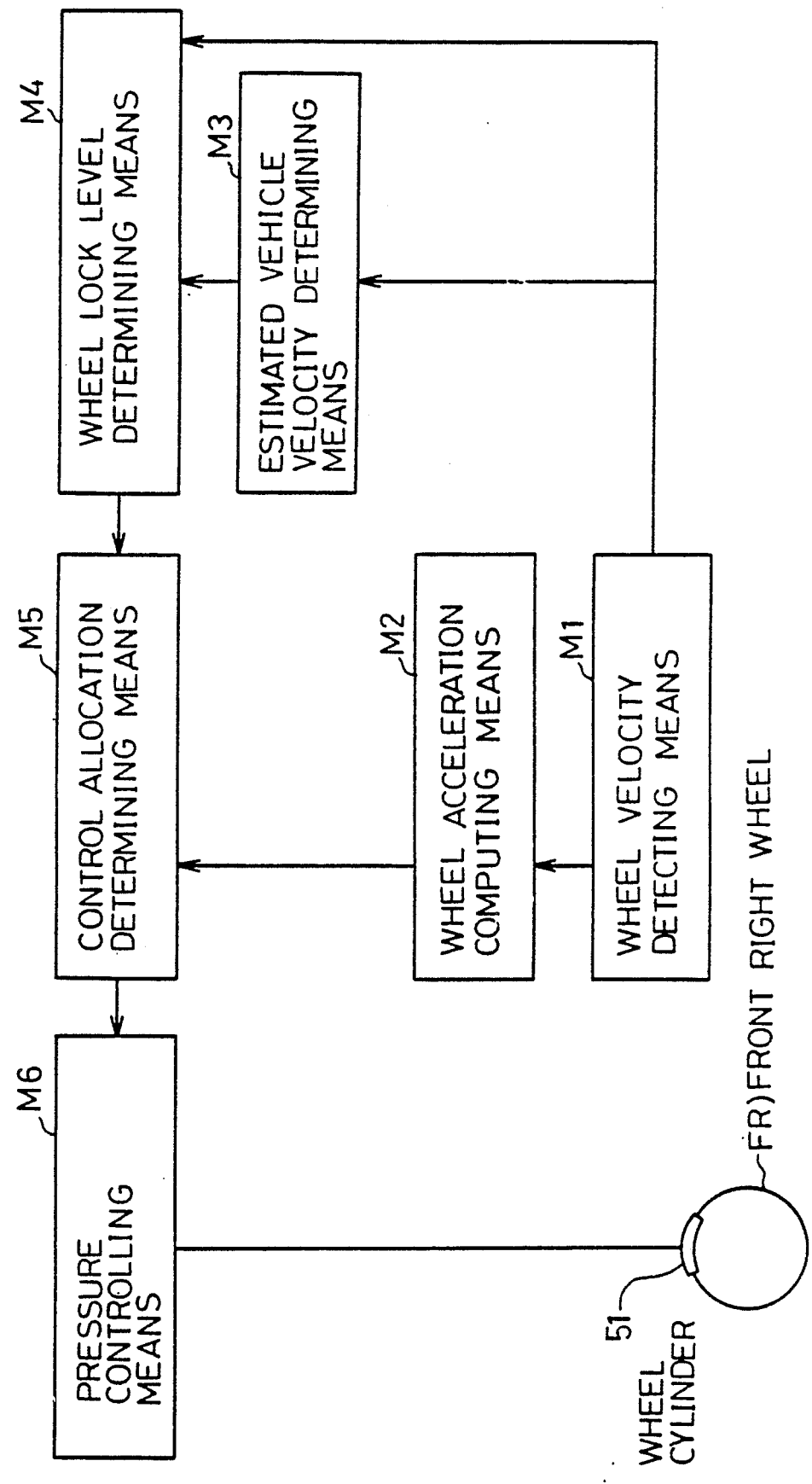
FIG. 1 is a block diagram of an anti-skid controlling apparatus generally embodying the present invention.
Figure 2:
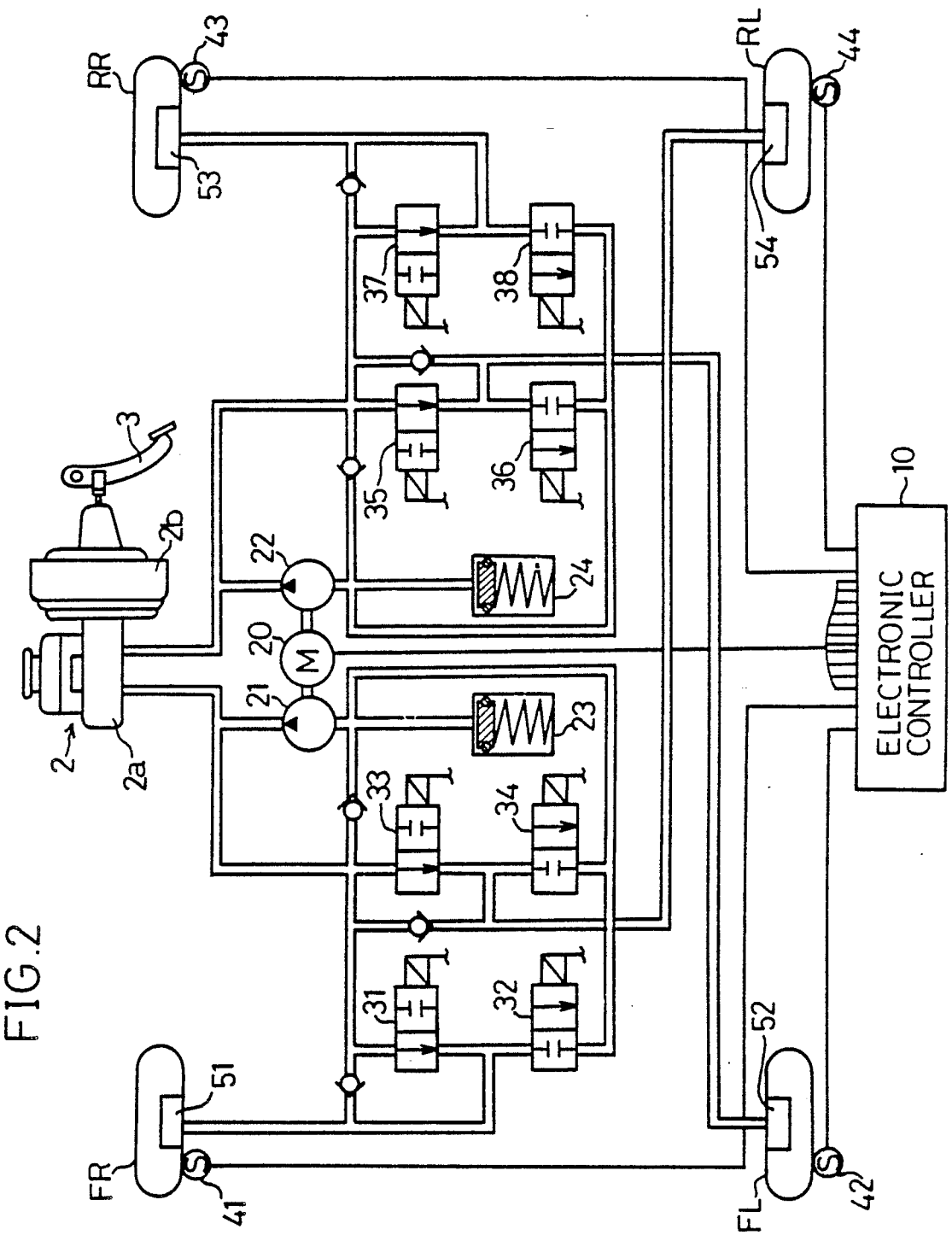
FIG. 2 is a view showing an overall construction of a first embodiment of the invention.

Preferred embodiments of the present invention will now be described by referring to the accompanying drawings. FIG. 2 shows the anti-skid controlling apparatus implemented as the first embodiment of the invention. In FIG. 2, a fluid pressure controller 2 comprising a master cylinder 2a and a booster 2b is driven by a brake pedal 3. Wheel cylinders 51 through 54 are attached to front-right (FR), front-left (FL), rear-right (RR) and rear-left (RL) wheels, respectively. The fluid pressure controller 2 and the wheel cylinders 51 through 54 are connected to a fluid pressure line on which pumps 21 and 22, reservoirs 23 and 24, and solenoid valves 31 through 38 are interposingly mounted. The wheels are designated as front-right and others as viewed from the driver's seat. As shown in FIG. 2, the so-called diagonal piping is adopted to interconnect the wheels.

The solenoid valves 31 and 32 are interposingly mounted on a fluid pressure line connecting the wheel cylinders 51 with one of the two output ports of the master cylinder 2a, and the solenoid valve 33 and 34 are interposingly mounted on a fluid pressure line connecting the wheel cylinder 54 with that one output port. The pump 21 is interposed between the solenoid valves 31 through 34 and the master cylinder 2a. Likewise, the solenoid valves 35 and 36 are interposingly mounted on a fluid pressure line connecting the wheel cylinder 52 with the other output port of the master cylinder 2a, and the solenoid valves 37 and 38 are interposingly mounted on a fluid pressure line connecting the wheel cylinder 53 with the other output port. The pump 22 is interposed between the solenoid valves 35 through 38 and the master cylinder 2a. The pumps 21 and 22 are operated by an electric motor 20. These fluid pressure lines are supplied with a brake fluid whose pressure is raised to a predetermined level. These lines apply the brake fluid pressure to usually open solenoid valves 31, 33, 35 and 37. The fluid pressure lines on the delivery side of usually closed solenoid valve 32 and 34 are connected to the pump 21 via the reservoir 23, and the lines on the delivery side of likewise usually closed solenoid valves 36 and 38 are connected to the pump 22 via the reservoir 24. The reservoirs 23 and 24 have a piston and a spring each. These reservoirs accommodate the brake fluid that returns from the solenoid valves 32, 34, 36 and 38 through the delivery side fluid pressure lines and, when the pumps 21 and 22 are operated, supply these pumps with the brake fluid.

The solenoid valves 31 through 38 are a two-port two-position electromagnetic selector valve each. When their solenoid coils are not energized, the valves are in the first position, as depicted in FIG. 2. In this state, the wheel cylinders 51 through 54 are concurrently connected to the fluid pressure controller 2 and to the pump 21 or 22. When their solenoid coils are energized, the valves are placed in the second position. This cuts off the wheel cylinders 51 through 54 from the fluid pressure controller 2 and from the pump 21 or 22 and concurrently connect these cylinders to the reservoir 23 or 24. The check valves shown in FIG. 2 are installed so that the brake fluid is allowed to flow from the wheel cylinders 51 through 54 as well as from the reservoirs 23 and 24 to the fluid pressure controller 2 and that the brake fluid is prevented from flowing in the reverse direction.

When the solenoid coils of the valves 31 through 38 are energized and de-energized as controlled, the brake fluid pressure in the wheel cylinders 51 through 54 (called the wheel cylinder fluid pressure) is increased and decreased as required. That is, when the solenoid coils of the valves 31 through 38 are not energized, the wheel cylinders 51 through 54 are supplied with the brake fluid pressure from the fluid pressure controller 2 and from the pump 21 or 22 so that the wheel cylinder fluid pressure is raised. When the solenoid coils are energized, the wheel cylinders 51 through 54 are concurrently connected to the reservoir 23 or 24 so that the wheel cylinder fluid pressure is lowered. The above eight-valve arrangement may be replaced by a four-valve arrangement with each valve being a three-port two-position electromagnetic selector valve.

The solenoid valves 31 through 38 are connected to an electronic controller 10 that controls the energizing and de-energizing of the solenoid coil in each valve. The motor 20 is also connected to the electronic controller 10 for control thereby. The FR, FL, RR and RL wheels are equipped with wheel velocity sensors 41 through 44, respectively, the sensors constituting the wheel velocity detecting means of the invention. These sensors are also connected to the electronic controller 10 and supplies it with a signal representing the rotating speed of each wheel, i.e., a wheel velocity signal. The wheel velocity sensors 41 through 44 are each a known electromagnetic induction sensor comprising a toothed rotor that rotates accompanying the wheel and a pickup installed opposite to the toothed portion of the rotor. As the wheel rotates, the sensor attached thereto outputs a voltage whose frequency is proportional to the rotating speed of the wheel. The above sensor arrangement may be replaced by a Hall IC or optical sensor arrangement.

Figure 3:
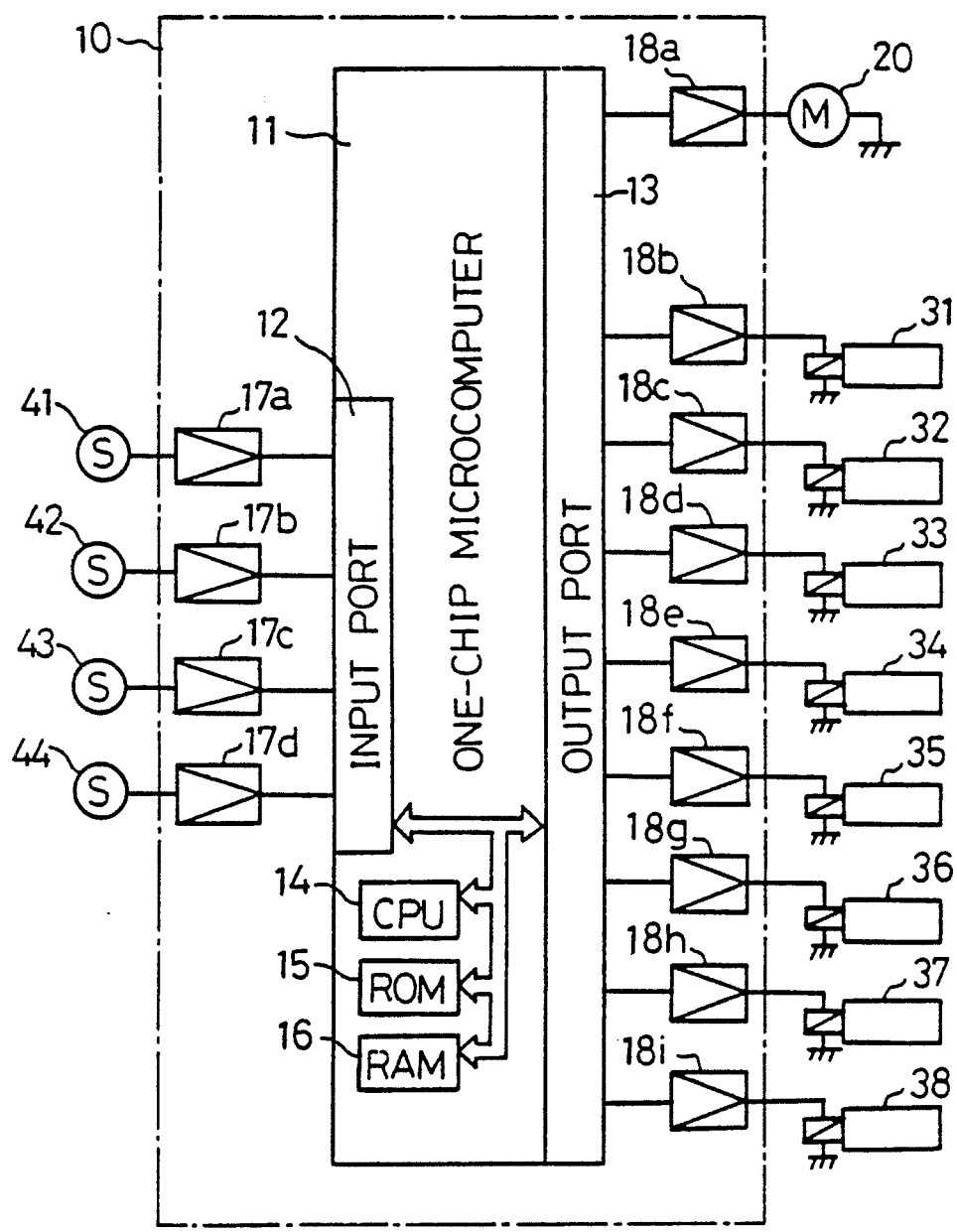
FIG. 3 is a block diagram of an electronic controller included in FIG. 2.
Figure 4:
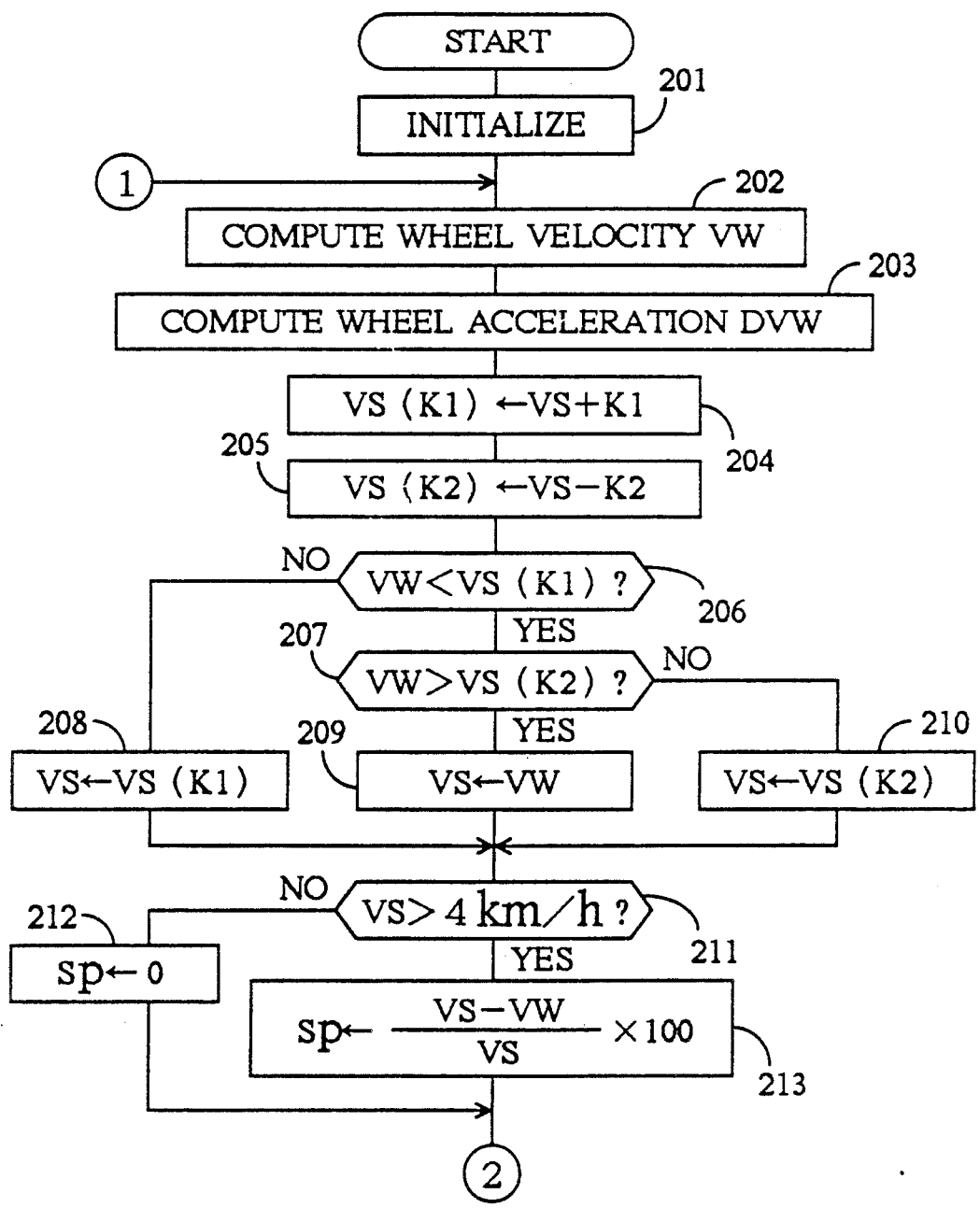
FIGS. 4, 5, 6, 7 and 8 are flowcharts depicting the steps to control the braking force with the first embodiment.

As illustrated in FIG. 3, the electronic controller 10 comprises a microcomputer 11 in which a CPU 14, a ROM 15 and a RAM 16 are connected via a common bus to an input port 12 and an output port 13 for output and input to and from the outside. The signals from the wheel velocity sensors 41 through 44 are input to the CPU 14 through the input port 12 via amplifiers 17a through 17d. A control signal is output to the motor 20 through the output port 13 via a driving circuit 18a. At the same time, control signals are also output to the solenoid valves 31 through 38 via the driving circuits 18b through 18i.

The electronic controller 11 carries out a series of steps to provide anti-lock control over the wheels. What follows is a description of how these steps are performed by reference to FIGS. 4 through 9.

FIGS. 4 through 8 are flowcharts showing how the first embodiment of the invention provides anti-skid control by taking the steps required. These steps are repeated at intervals of a predetermined period of time. First of all as a preliminary process, counters and timers are initialized in step 201 of FIG. 4.

Before the control steps are discussed in detail, a brief description of the counters and timers used by the first embodiment is in order. A mode register and a flag register are provided as internal registers. The mode register is used to set at least one of a pressure decreasing mode, a pressure increasing mode and a pressure holding mode. The pressure decreasing, increasing and holding modes are modes in which the brake fluid pressure in the wheel cylinders 51 through 54 is decreased, increased and held constant, respectively. Also set to the mode register is any of a pulse-driven pressure increase mode, a pulse-driven pressure decrease mode and an abrupt pressure decrease mode. The pulse-driven pressure decrease mode is a mode in which the brake fluid pressure is decreased for a predetermined period of time, and then held constant for another predetermined period of time; the pressure decreasing and pressure holding actions are alternated over time. Likewise, in the pulse-driven pressure increase mode, the brake fluid pressure is increased for a predetermined time and then held constant for another predetermined time, the two actions being alternated over time. The abrupt pressure decrease mode is a mode in which only the decrease of the brake fluid pressure is carried out. Decreases in brake fluid pressure in this mode are more precipitous than in the pulse-driven pressure decrease mode. And there are at least provided an abrupt pressure decrease flag and a pulse-driven pressure increase flag. When the abrupt pressure decrease flag is set (to "1"), the abrupt pressure decrease mode is entered; when the pulse-driven pressure increase flag is set, the pulse-driven pressure increasing mode is entered.

There is at least provided a pulse-driven pressure increase counter that counts the number of times the pulse-driven pressure increase is carried out. And there are at least provided a pressure decreasing timer, a pressure increasing timer and a pressure holding timer in addition to a system timer. The pressure decreasing, increasing and holding timers are constructed to output a pressure decreasing mode signal, a pressure increasing mode signal and a pressure holding mode signal, respectively, for individually predetermined periods of time.

Figure 5:
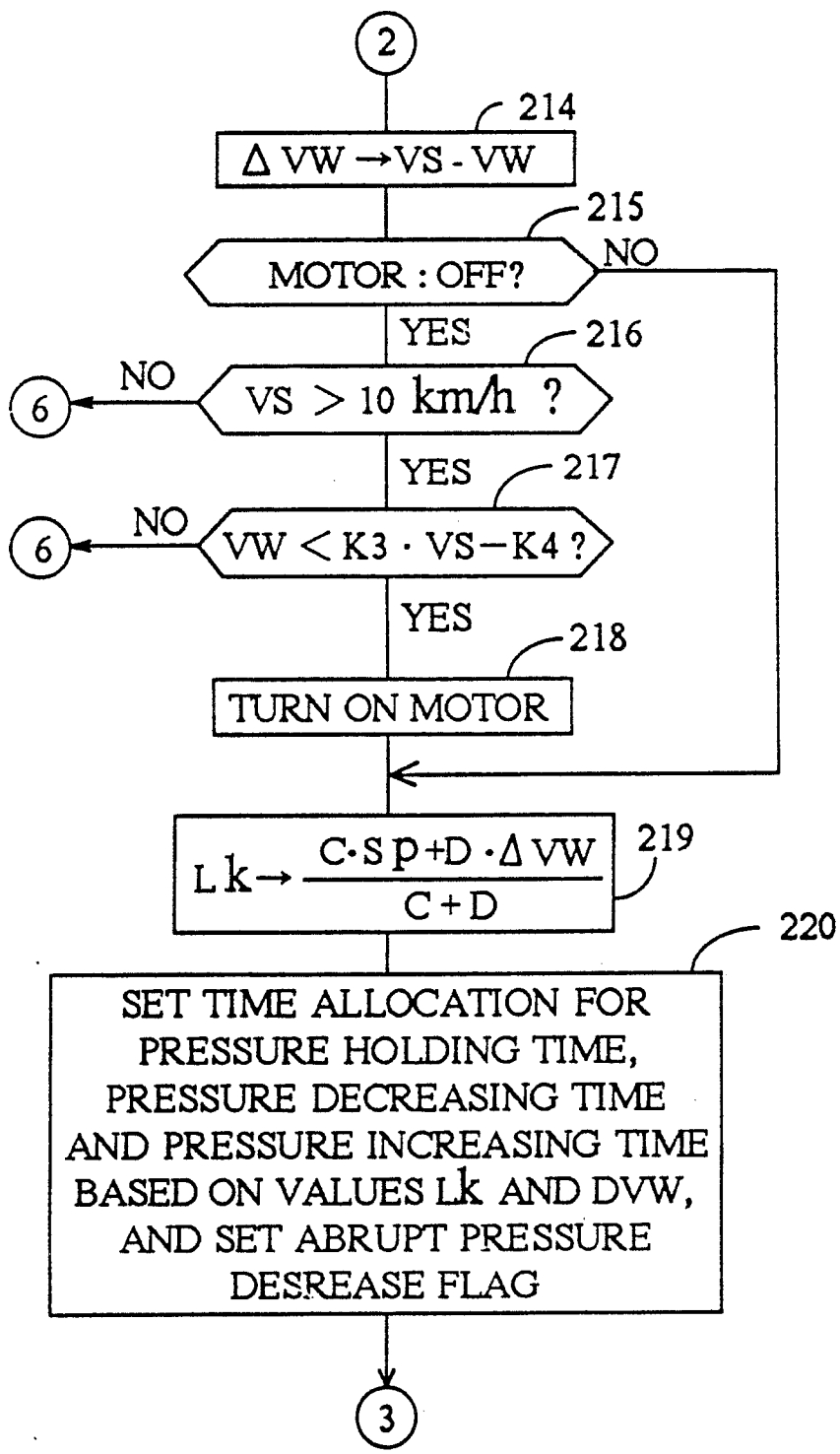

Referring now to FIG. 5, in step 202, the wheel velocity of each wheel is computed by known methods based on the output signals from the wheel velocity sensors 41 through 44. In order to simplify the description that follows, one wheel with its wheel velocity Vw is considered to represent all wheels. In step 203, a wheel acceleration DVw is computed from the wheel velocity Vw. As described earlier, the wheel acceleration DVw also includes a deceleration; the acceleration is expressed by a positive value and the deceleration by a negative value.

In step 204, a first set velocity Vs(K1) is obtained by adding a predetermined velocity K1 to an estimated vehicle velocity Vs gained earlier. In step 205, a second set velocity Vs(K2) is acquired by subtracting a predetermined velocity K2 from the estimated vehicle velocity Vs. The velocity K1 is equivalent to 4.0 G (gravitational acceleration), the maximum value of vehicle acceleration $\alpha_{UP}$; the velocity K2 is equivalent to $-1.2$ G, the minimum value of vehicle deceleration $\alpha_{DN}$.

In step 206, the wheel velocity Vw is compared with the first set velocity Vs(K1). If the wheel velocity Vw is higher than the first set velocity Vs(K1), step 208 is reached in which the first set velocity Vs(K1) is set as the estimated vehicle velocity Vs. If the wheel velocity Vw is found to be not higher than the first set velocity Vs(K1) in step 206, step 207 is reached where the wheel velocity Vw is compared with the second set velocity Vs(K2). If the wheel velocity Vw is found to be higher than the second set velocity Vs(K2) in step 207, step 209 is reached where the wheel velocity Vw is set as the estimated vehicle velocity Vs. If the wheel velocity is found to be not higher than the second set velocity Vs(K2) in step 207, step 210 is reached where the second set velocity Vs(K2) is set as the estimated vehicle speed Vs. On a vehicle where each of the wheels has its own wheel velocity sensor, the estimated vehicle velocity Vs is computed by known methods based on the highest wheel velocity.

In step 211, the estimated vehicle velocity Vs obtained above is compared with 4 km/h, the lowest velocity for activating control. If the estimated vehicle velocity Vs is not higher than the lowest control-activating velocity, step 212 is reached where the slip ratio Sp is set as zero. Then step 214 is reached. If the estimated vehicle velocity Vs is higher than the lowest control-activating velocity, step 213 is reached where the slip ratio Sp is computed based on the estimated vehicle velocity Vs and the wheel velocity Vw. Then step 214 is reached.

In step 214 of FIG. 5, a vehicle velocity deviation ΔVw is computed as the discrepancy between the estimated vehicle velocity Vs and the wheel velocity Vw. In step 215, a check is made to see if the motor 20 is turned off, i.e., if control is off. If the motor 20 is found to be turned on, i.e., if control is on, step 219 is reached. If the motor 20 is found to be turned off, as in the initial state, step 216 and/or step 217 is reached where further checks are made.

In step 216, a check is made to see if the estimated vehicle velocity Vs is higher than a predetermined velocity of 10 km/h. If the velocity Vs is not higher than 10 km/h, a jump is made to step 225. If the estimated vehicle velocity Vs is higher than 10 km/h, step 217 is reached where a check is made to see if a condition of the step is met. If the condition is not met in step 217, step 225 is reached. If the condition is met in step 217, step 218 is reached where the motor 20 is turned on. The value K3·Vs−K4 in step 217 represents a reference velocity by which to determine whether or not to activate anti-skid control on the wheel having the wheel velocity Vw. Also in step 217, K3 and K3 are both constants, 0.95 and 2.0 km/h, respectively. These constants may vary from vehicle to vehicle.

In step 219, a wheel lock level Lk indicating how much the wheel is locked is computed using the equation (1) below.

$$Lk = \frac{C \cdot Sp + D \cdot \Delta Vw}{C + D} \quad (1)$$

where, C and D are both constants that are used to weight the slip ratio Sp and wheel velocity deviation ΔVw. Generally, increasing the weight for the slip ratio Sp tends to cause an abrupt pressure decrease in the low speed region, while increasing the weight for the wheel velocity deviation ΔVw is liable to trigger an abrupt pressure drop in the high speed region.

Figure 9:
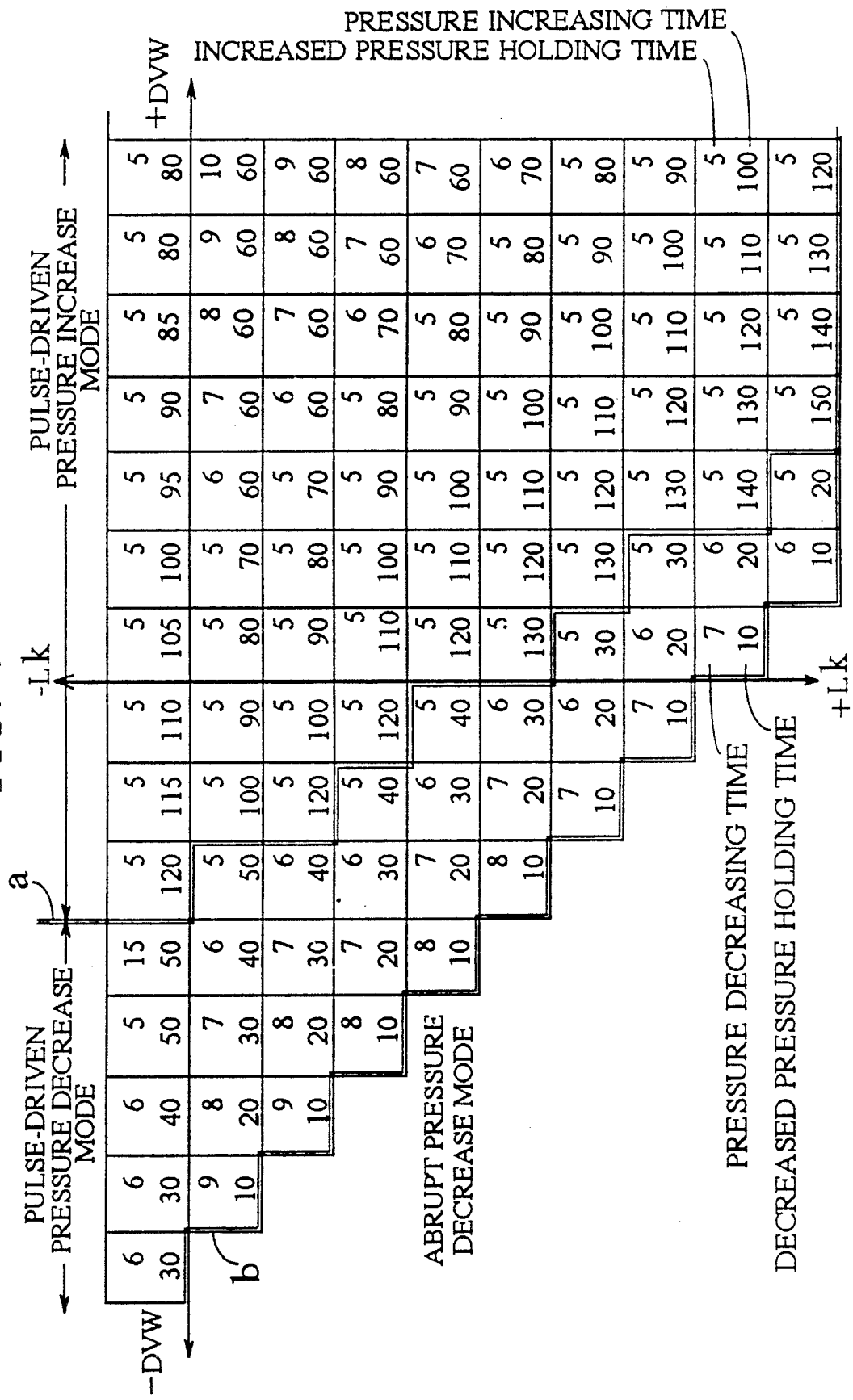
FIG. 9 is a graphic representation illustrating the time allocation involving typical pressure increasing time settings, pressure decreasing time settings and holding time settings for the first embodiment, the settings being determined depending on wheel acceleration and wheel lock level.

In step 220, if the pulse-driven pressure decrease mode is selected depending on the wheel lock level Lk and on the wheel acceleration DVw, time is allocated for decreasing and for holding constant the wheel cylinder fluid pressure according to a certain range of time allocation settings in the map of FIG. 9. If the pulse-driven pressure increase mode is selected likewise, time is allocated for increasing and for holding constant the wheel cylinder fluid pressure according to another range of time allocation settings in the same map. If the range of the abrupt pressure decrease mode is applicable, the abrupt pressure decrease flag is set (to "1").

A brief description is herein made of the map shown in FIG. 9. The horizontal axis of the map stands for the wheel acceleration DVw, and the vertical axis thereof for the wheel lock level Lk. Toward the lower and higher ends of the vertical axis are positive and negative values of the wheel lock level Lk, respectively. On the horizontal axis, the point at which the vertical axis intersects represents 0 G. To the right and to the left of this point on the axis exist positive and negative values of the wheel acceleration DVw, respectively, the negative values representing degrees of deceleration. Values of the wheel acceleration DVw and of the wheel lock level Lk constitute a matrix formation, as shown in FIG. 9. The portion enclosed by double lines "a" and "b" stands for the pulse-driven pressure decrease mode. On the right of the double line "a" is the pulse-driven pressure increase mode. On the left of the double line "b" is the abrupt pressure decrease mode in which the holding time is set for zero. In the pulse-driven pressure increase mode, each box making up the matrix formation contains a pressure increasing time (upper number) and an increased pressure holding time (lower number); in the pulse-driven pressure decrease mode, each box is assigned a pressure decreasing time (upper) and a decreased pressure holding time (lower). In either mode, the time settings are given in units of milliseconds (ms).

The pulse-driven pressure decrease mode is a mode in which the wheel cylinder fluid pressure is decreased and then held constant, the two actions being alternated. The solenoid valves 31 through 38 are operated in accordance with the pressure decreasing time and the decreased pressure holding time currently in effect so that the wheel cylinder fluid pressure is lowered. That is, the speed of pressure decrease is controlled depending on the ratio of pressure decreasing time to decreased pressure holding time. Likewise in the pulse-driven pressure increase mode, the solenoid valves 31 through 38 are controlled according to the ratio of pressure increasing time to increased pressure holding time. The pressure decreasing time, pressure increasing time and pressure holding time are counted respectively by the pressure decreasing timer, pressure increasing timer and pressure holding timer mentioned above.

The time allocation for pressure decreasing and holding time settings in the pulse-driven pressure decrease mode will now be described. The wheel acceleration DVw represents excesses and deficiencies of the wheel cylinder fluid pressure DVw. The pressure decreasing time and decreased pressure holding time are allocated so that as the wheel acceleration DVw drops, i.e., as the deceleration increases, the decrease in wheel cylinder fluid pressure becomes greater. This means that the pressure decreasing time is made longer and the decreased pressure holding time shorter. Where the wheel lock level Lk is high, the vehicle is judged to be running over a road surface whose friction coefficient is low. Since the speed of pressure decrease is low where the wheel cylinder fluid pressure is relatively low, the pressure decreasing time and decreased pressure holding time are allocated in this case in a way that increases the amount of pressure decrease.

In the pulse-driven pressure increase mode, when the wheel acceleration DVw is high, the pressure increasing time and increased pressure holding time are allocated so that the increase in wheel cylinder fluid pressure is high even if the wheel lock level Lk is high. This keeps the braking distance from getting longer due to a low wheel cylinder fluid pressure. If the wheel tends to lock after the wheel lock level Lk is made lower, the wheel cylinder fluid pressure is gradually increased so that the wheel velocity Vw is protected from an abrupt decrease.

In the manner described, the pressure decreasing time and decreased pressure holding time in the pulse-driven pressure decrease mode, as well as the pressure increasing time and increased pressure holding time in the pulse-driven pressure increase mode, are suitably allocated. In turn, optimal time allocation settings make it possible to provide fine-tuned anti-skid control depending on the responsiveness of the solenoid valves 31 through 38, on the speed of pressure decrease or of pressure increase, and on other factors related to the braking of the vehicle.

Figure 6:
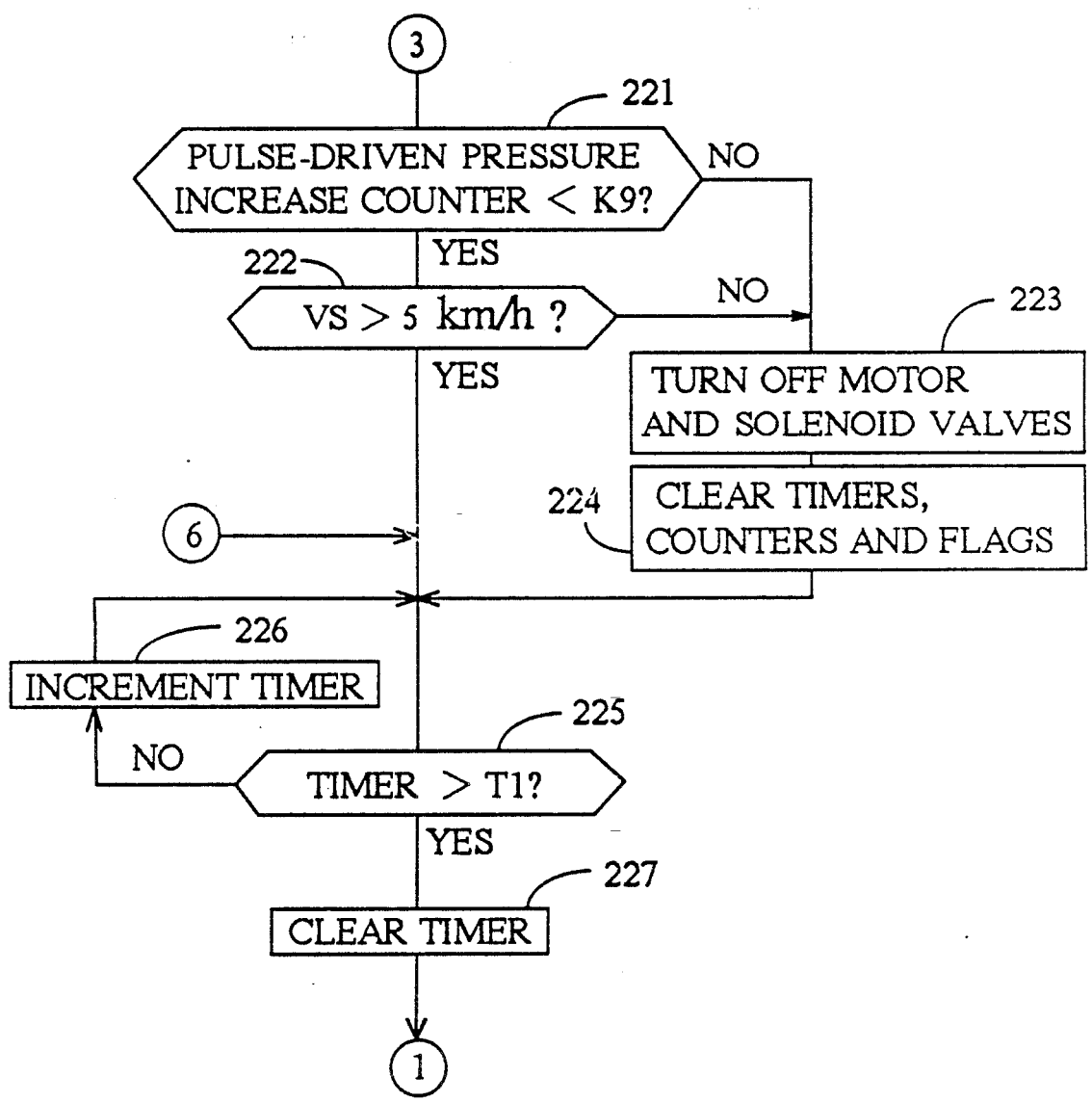

Referring now to FIG. 6, checks are made in steps 221 and 222 to see if certain conditions for terminating control are met. If the count of the pulse-driven pressure increase counter is less than a predetermined count K9, and if the estimated vehicle velocity Vs is higher than 5 km/h, then step 225 is reached. If the count of the pulse-driven pressure increase counter is not less than the count K9, and if the estimated vehicle velocity Vs is not higher than 5 km/h, step 223 is reached where the motor 20 is deactivated and the solenoid valves 31 through 35 are turned off. In step 224, the pressure holding timer, pressure decreasing timer and pressure increasing timer are all cleared, and so are the pulse-driven pressure increase counter, pulse-driven pressure increase flag and abrupt pressure decrease flag.

In steps 225 through 227, a computing cycle of usually 3 to 5 ms is established. If the count of the system timer is not higher than a predetermined time T1, the timer is incremented in step 226. Upon elapse of the time T1, the system counter is cleared in step 227, and step 202 is reached again.

Figure 7:
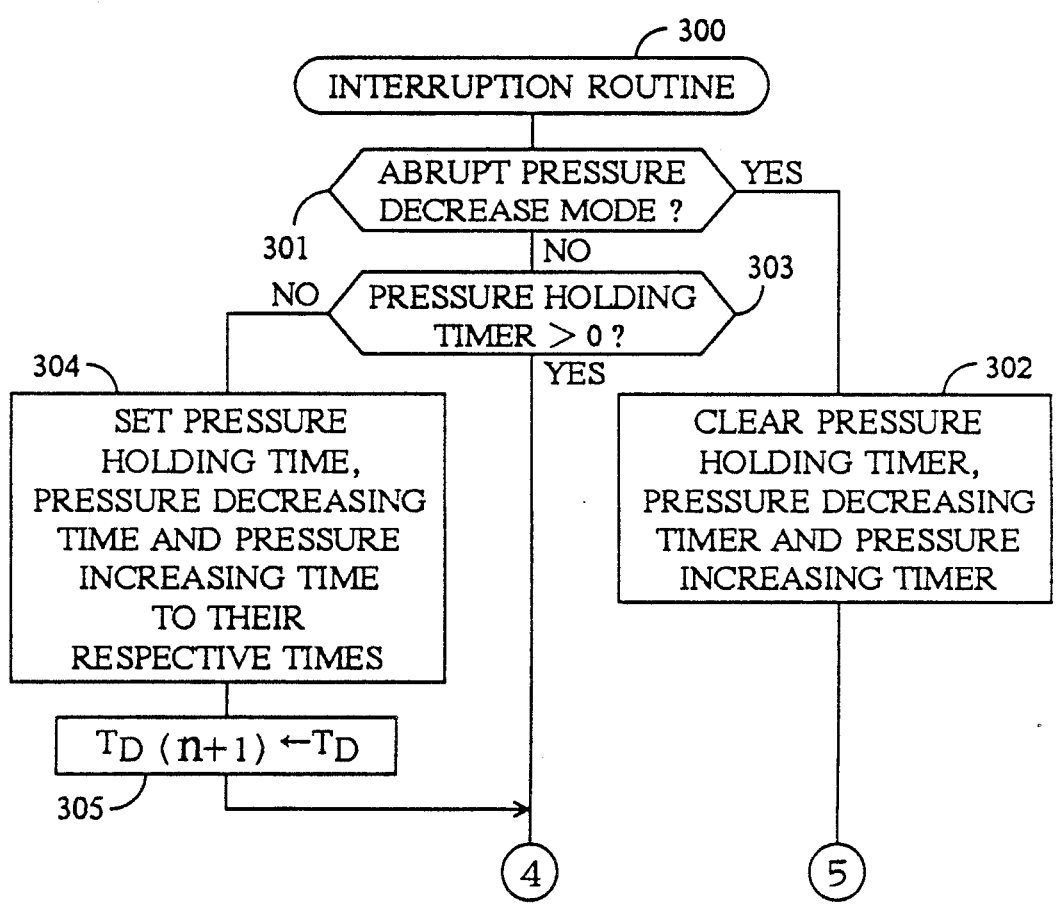
Figure 8:
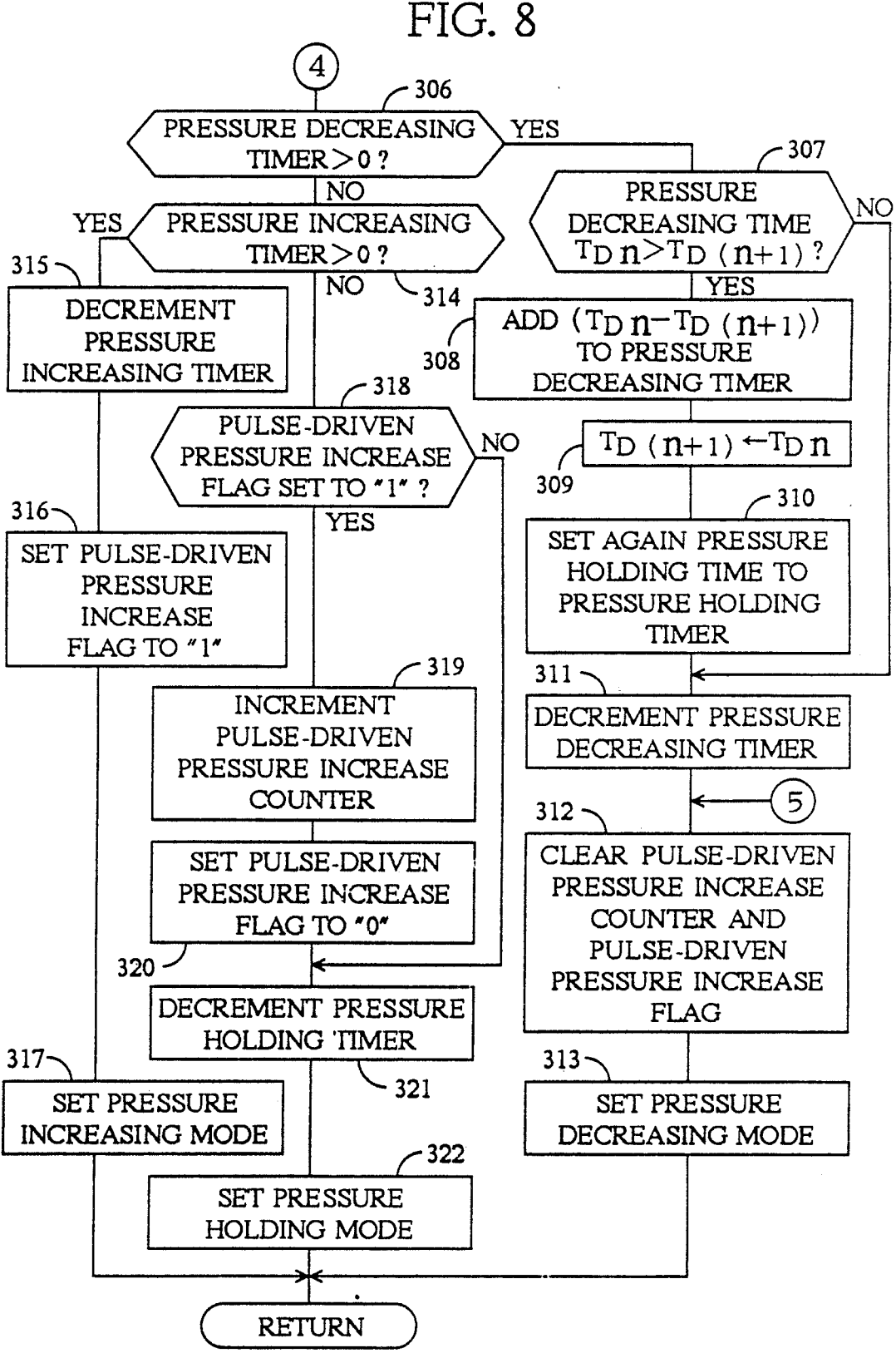

Referring to FIGS. 7 and 8, step 300 and subsequent steps constitute a routine by which to interrupt the above-described processing at intervals of 1 ms. A driving signal is output to the solenoid valves 31 through 38. In step 301, a check is made to see if the abrupt pressure decrease mode is in effect, i.e., if the abrupt pressure decrease flag is set following step 220. If the abrupt pressure decrease mode is in effect, step 302 is reached where the pressure holding timer, pressure decreasing timer and pressure increasing timer are cleared to zero. Then step 312 is reached, which will be described later.

If the abrupt pressure decrease mode is not in effect in step 301, a check is made in step 303 to see if the pressure holding timer is set, i.e., if the count thereof is greater than zero. If the count is greater than zero, step 304 is reached where the pressure holding time, pressure decreasing time and pressure increasing time which were established in step 220 are set to the pressure holding timer, pressure decreasing timer and pressure increasing timer, respectively. In step 305, the current pressure decreasing time $T_D$ is set as the next pressure decreasing time $T_{D(n+1)}$.

Referring now to FIG. 8, a check is made in step 306 to see if the pressure decreasing timer is set. If the pressure decreasing timer is set, steps 307 through 313 are reached where the pulse-driven pressure decrease mode is selected. In steps 307 through 310, the pressure decreasing time is made shorter and set again if it exceeds the applicable region in the map of FIG. 9 while a pressure decreasing signal is being output in the pulse-driven pressure decrease mode. That is, if the pressure decreasing time $T_{Dn}$ is greater than the next pressure decreasing time $T_{D(n+1)}$ established in step 305, the difference between the two values $(T_{Dn} - T_{D(n+1)})$ is added to the current count of the pressure decreasing timer. This pressure decreasing time $T_{Dn}$ is set again as the next pressure decreasing time $T_{D(n+1)}$. In step 310, the current pressure holding time is set again on the pressure holding timer based on the map of FIG. 9. After the pressure decreasing timer is decremented by 1 in step 311, the pulse-driven pressure increase counter and the pulse-driven pressure increase flag are both cleared to zero in step 312.

In step 313, a pressure decreasing signal is output. As a result, the solenoid valves 31, 33, 35 and 37 on the brake fluid supply side in FIG. 2 are activated to cut off the supply of the brake fluid. At the same time, the solenoid valves 32, 34, 36 and 38 on the delivery side are turned on to send the brake fluid to the reservoirs 23 and 24.

If the pressure decreasing timer is not found to be set in step 306, a check is made in step 314 to see if the pressure increasing timer is set. If the pressure increasing timer is found to be set in step 306, step 315 is reached where the pressure increasing timer is decremented by 1. In step 316, the pulse-driven pressure increase flag is set (to "1"). In step 317, the pressure increasing mode is selected. In this mode, the solenoid valves 31 through 38 are all turned off and enter the state shown in FIG. 2. The supply side of the brake fluid is opened, while the delivery side thereof is closed.

If the pressure increasing timer is not found to be set in step 314, i.e., if the count thereof is zero, step 318 is reached where a check is made to see if the pulse-driven pressure increase flag is set. If the flag is found to be set, step 319 is reached where the pulse-driven pressure increase counter is incremented by 1. In step 320, the pulse-driven pressure increase flag is cleared to zero. After the pressure holding timer is decremented by 1 in step 321, the pressure holding mode is selected in step 322. If the pulse-driven pressure increase flag is not found to be set in step 318, steps 319 and 320 are skipped before step 322 is reached. In step 322, the solenoid valves 31, 33, 35 and 37 are turned on and the valves 32, 34, 36 and 38 are turned off so that the wheel cylinder fluid pressure in the wheel cylinders 51 through 54 is maintained.

As described, the first embodiment of the invention suitably establishes the time allocation for the pressure decreasing time and decreased pressure holding time, as well as the time allocation for the pressure increasing time and increased pressure holding time, in accordance with the correlation between wheel acceleration DVw and wheel lock level Lk. Optimal time allocation settings are thus available, allowing for the pressure increasing and decreasing characteristics of the pressure controlling means including the solenoid valves 31 through 38. For example, if the wheel acceleration DVw and the wheel lock level Lk are each close to zero, the time allocation is established so that the amount of pressure decrease is lowered. When the wheel acceleration DVw is lowered (i.e., deceleration increased) and the wheel lock level Lk raised, the pressure decreasing time under control is gradually made longer. This minimizes the effect of dispersed delays in the action taken by the pressure controlling means such as the solenoid valves 31 through 38.

In a region where the wheel acceleration DVw is relatively low, the wheel velocity Vw begins to go up. In such a region, the pressure increasing time is shortened so as to prevent the wheel from getting locked.

FIGS. 10 through 13 are flowcharts showing the steps in which the second embodiment of the invention provides anti-skid control. Steps 210 through 214 with the second embodiment are the same as those with the first embodiment and are thus omitted from the description that follows. With the second embodiment, the time allocation for the pressure increasing, pressure decreasing and pressure holding times is established in the pulse-driven pressure increase mode as well as in the pulse-driven pressure decrease mode based on predetermined equations. The second embodiment also includes a pressure holding flag which is set (to "1") when the pressure holding mode is selected.

Figure 10:
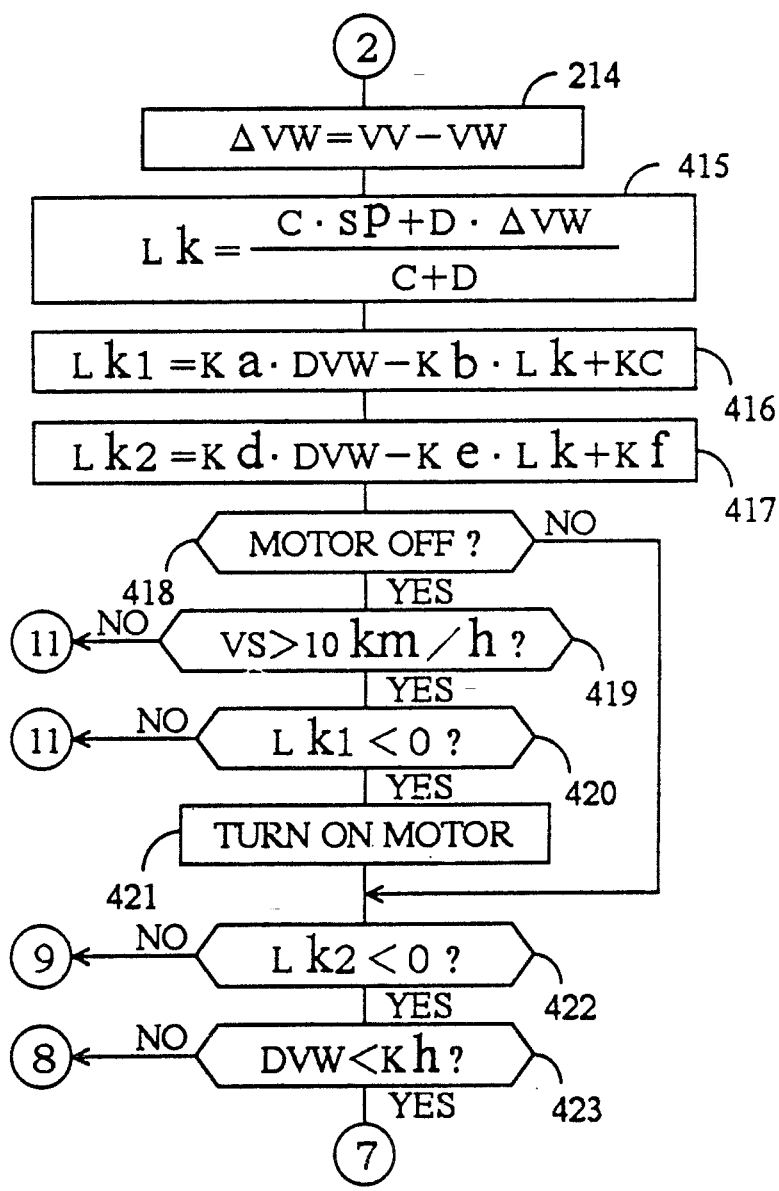
FIGS. 10, 11, 12, 13 and 14 are flowcharts depicting the steps to control the braking force with a second embodiment of the invention.

In FIG. 10, step 214 is followed by step 415 where the same process as the above-described step 219 is carried out. That is, the wheel lock level Lk indicating how much the wheel is locked is computed.

In step 416, a first target value Lk1 of the wheel lock level Lk is set using the equation (2) below, and a second target value Lk2 thereof is set using the following equation (3):

$$Lk1 = Ka \cdot DVw - Kb \cdot Lk + Kc \quad (2)$$

$$Lk2 = Kd \cdot DVw - Ke \cdot Lk + Kf \quad (3)$$

where, $Ka=1$, $Kb=1$, $Kc=5$, $Kd=2.5$, $Ke=1$ and $Kf=3$, each being a constant.

The first target value Lk1 provides the reference by which to determine the control starting region depicted in FIG. 15. The second target value Lk2 provides the reference by which to determine the pulse-driven pressure increase mode region shown in FIG. 16.

In step 418, a check is made to see if the motor 20 is turned off. If the motor is found to be turned on, i.e., if control is on, step 422 is reached. If the motor 20 is found to be off in step 418, step 419 and/or step 420 is reached where checks are made to see if certain conditions for starting control are met. In step 419, the estimated vehicle velocity Vs is compared with a predetermined velocity of 10 km/h. If the velocity Vs is not higher than 10 km/h, a jump is made to step 443. If the velocity Vs is higher than 10 km/h, a check is made in step 420 to see if the first target value Lk1 is less than zero. If the first target value Lk1 is not less than zero, a jump is made to step 443. If the value Lk1 is less than zero, step 421 is reached where the motor 20 is turned on. That is, anti-skid control is provided when the relationship between wheel acceleration DVw and wheel lock level Lk falls within the shaded region of FIG. 15.

Figure 11:
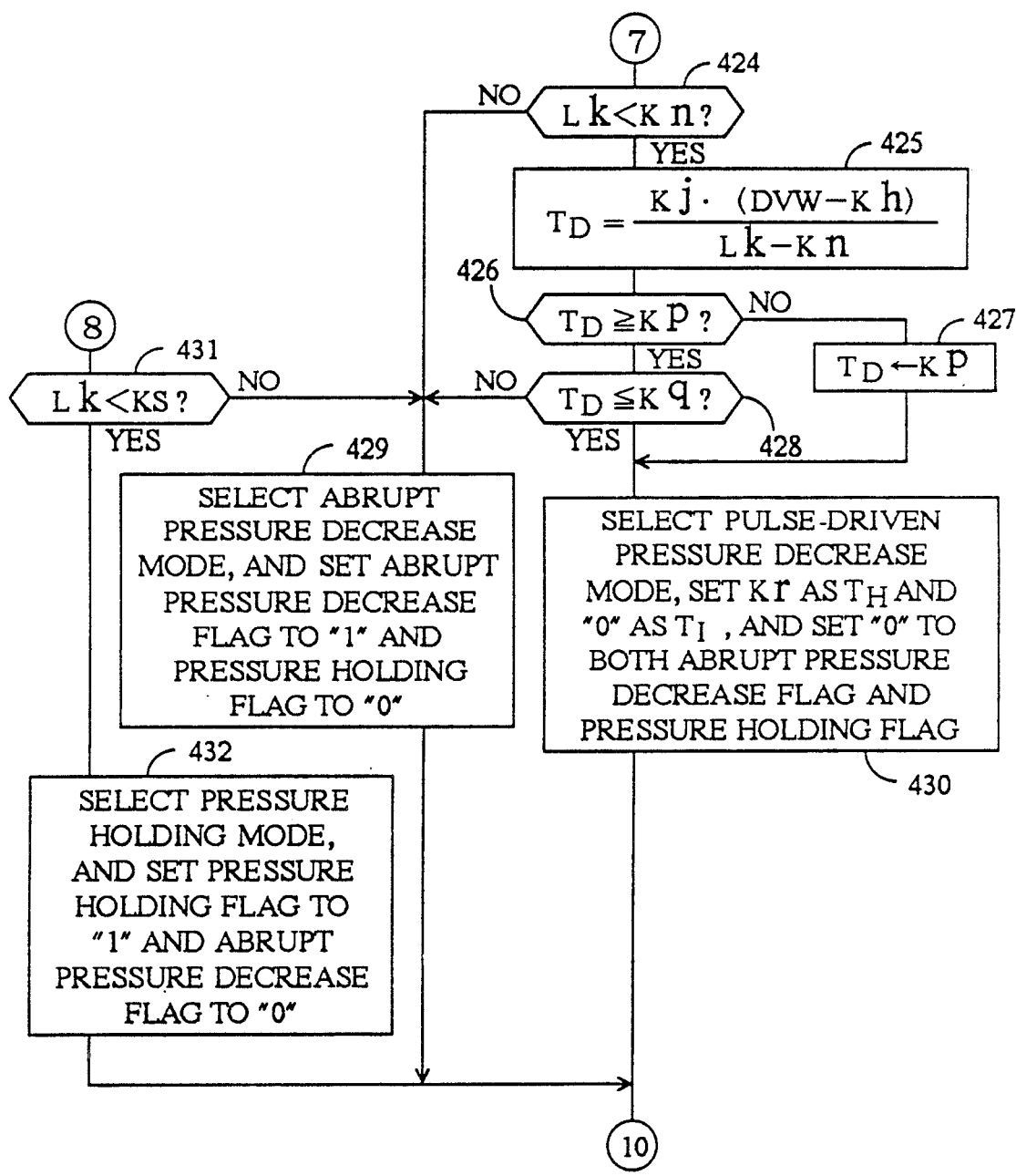
Figure 12:
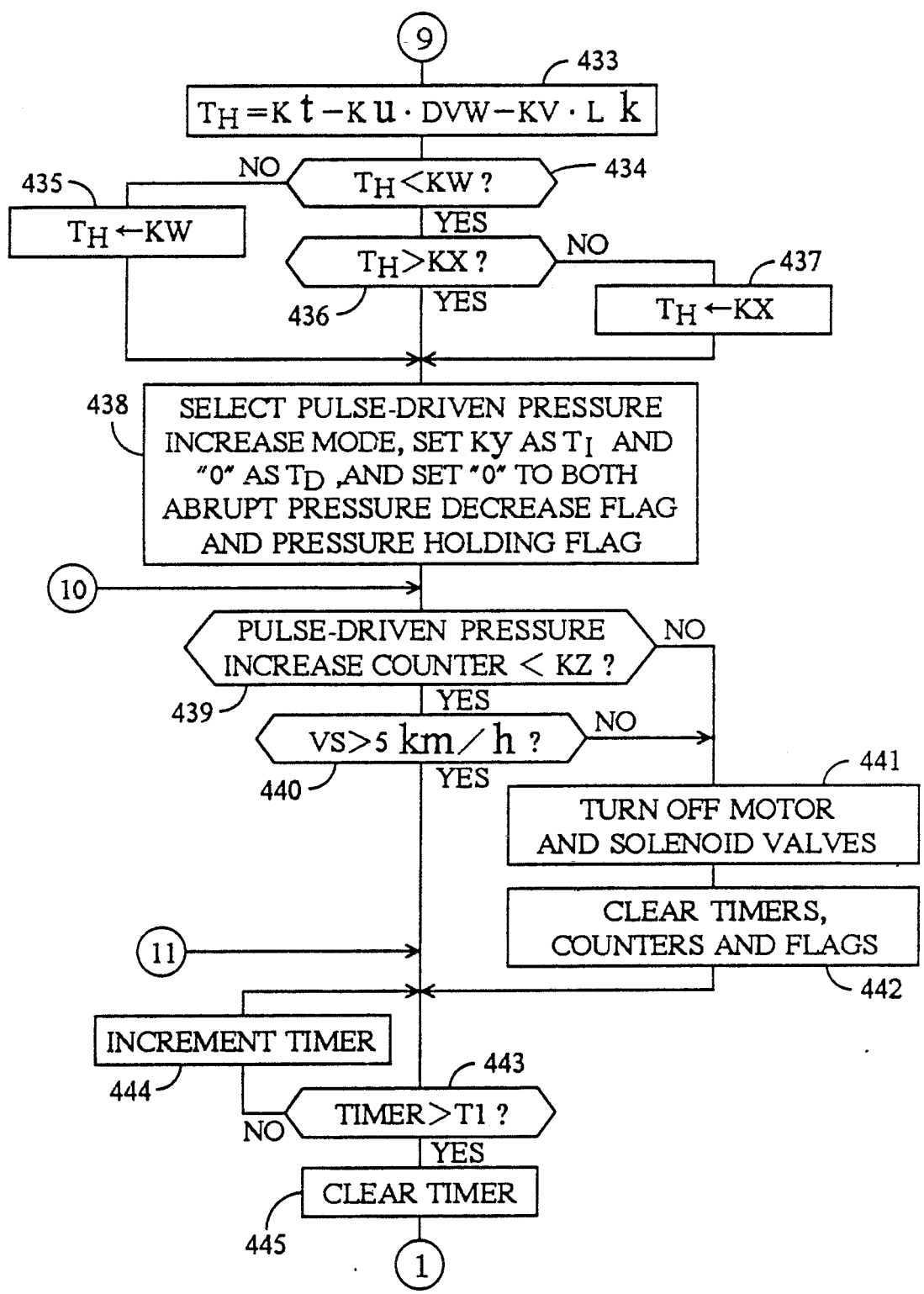

In step 422, a check is made to see if the second target value Lk2 is less than zero. If the value Lk2 is not less than zero, a jump is made to step 443 of FIG. 12 where the pulse-driven pressure increase mode is selected. If the second target value Lk2 is less than zero, step 423 is reached where the wheel acceleration DVw is compared with a predetermined value Kh which may illustratively be 0.3 G (gravitational acceleration). If the wheel acceleration DVw is not less than the value Kh, step 431 of FIG. 11 is reached where a check is made to see if either the pressure holding mode or the abrupt pressure decrease mode is set. If the wheel acceleration DVw is found to be less than the value Kh in step 423, step 424 is reached where a check is made to see if either the pulse-driven pressure decrease mode or the abrupt pressure decrease mode is set.

In step 424 of FIG. 11, the wheel lock level Lk is compared with a predetermined value Kn which may illustratively be 25. If the wheel acceleration DVw is not less than the value Kn, the abrupt pressure decrease mode region shown as shaded in FIG. 16 is applicable. In this case, step 249 is reached where the abrupt pressure decrease mode is set. If the wheel acceleration DVw is less than the value Kn, the pulse-driven pressure decrease mode region of FIG. 16 is applicable. In this case, step 425 is reached where the pressure decreasing time $T_D$ for the pulse-driven pressure decrease mode is computed using the following equation (4) before step 426 is reached:

$$T_D = \frac{K_j \cdot (DVw - Kh)}{Lk - Kn} \quad (4)$$

where, Kw is a constant which may be illustratively 30.

If the pressure decreasing time $T_D$ is less than a predetermined minimum time Kp in step 426, step 427 is reached where the time Kp is set as the pressure decreasing time $T_D$, and then step 430 is reached. If the pressure decreasing time $T_D$ is not less than the time Kp, step 428 is reached where the time $T_D$ is compared with a predetermined time Kq. With the second embodiment, Kp and Kq may illustratively be 5 ms and 20 ms, respectively. If the pressure decreasing time $T_D$ is greater than the time Kq in step 428, the abrupt pressure decrease mode region of FIG. 16 is applicable. In this case, step 429 is reached where the abrupt pressure decrease mode is selected, the abrupt pressure decrease flag is set (to "1") and the pressure holding flag is cleared (to "0").

If the pressure decreasing time $T_D$ is not more than the time Kq in step 428, the pulse-driven pressure decrease mode region of FIG. 16 is applicable. In this case, step 430 is reached where the pulse-driven pressure decrease mode is set. Also in step 430, a predetermined time Kr is set as the pressure holding time $T_H$ and 0 as the pressure increasing time $T_I$, both the abrupt pressure decrease flag and the pressure holding flag are cleared to zero. With the second embodiment, the time Kr is set for 30 ms. In the pulse-driven pressure decrease mode of FIG. 16, the pressure holding time $T_H$ remains constant (Kr=30 ms), while the pressure decreasing time $T_D$ is suitably set between Kp (5 ms) and Kq (20 ms) using the equation (4) above, with the wheel acceleration DVw and the wheel lock level Lk taken into account for the computation.

In step 431, the wheel lock level Lk is compared with a predetermined value Ks (e.g., Ks=60). If the wheel lock level Lk is not less than the value Ks, the abrupt pressure decrease mode region of FIG. 16 is applicable. In this case, step 429 is reached where the abrupt pressure decrease mode is set. That is, the abrupt pressure decrease flag is set (to "1") and the pressure holding flag is cleared (to "0"). If the wheel lock level Lk is less than the value Ks in step 431, step 432 is reached where the abrupt pressure decrease flag is cleared (to "0") and the pressure holding flag is set (to "1") so that the pressure holding mode is selected.

If the second target value LK2 is not less than zero in step 422 of FIG. 9, the pulse-driven pressure increase mode region of FIG. 16 is applicable. In this case, step 433 is reached where the pressure holding time $T_H$ is computed using the following equation (5):

$$T_H = Kt - Ku \cdot DVw - Kv \cdot Lk \quad (5)$$

where, $Kt=150$, $Ku=20$ and $Kv=2$, each being a constant.

In step 434, the pressure holding time $T_H$ is compared with a predetermined maximum time Kw. If the pressure holding time $T_H$ is not less than the time Kw, the time Kw is set as the time $T_H$, and step 438 is reached. If the pressure holding time $T_H$ is less than the time Kw, step 436 is reached where the time $T_H$ is compared with a predetermined minimum time Kx. If the pressure holding time $T_H$ is not more than the time Kx in step 436, the time Kx is set as the pressure holding time $T_H$, and step 438 is reached. In step 438, the pulse-driven pressure increase mode is selected, a predetermined time Ky is set as the pressure increasing time $T_I$, and the pressure decreasing time $T_D$ is set for zero. Both the abrupt pressure decrease flag and the pressure holding flag are cleared to zero. With the second embodiment, the times Kw, Kx and Ky are 150 ms, 20 ms and 5 ms, respectively.

In the pulse-driven pressure increase mode region of FIG. 16, the pressure increasing time $T_I$ remains constant (Ky=5 ms), while the pressure holding time $T_H$ is suitably set between Kw (150 ms) and Kx (20 ms) using the equation (5) above, with the wheel acceleration DVw and the wheel lock level Lk taken into account for the computation.

In step 439, a predetermined count Kz is compared with an output count of the pulse-driven pressure increase mode, the count being counted by the pulse-driven pressure increase counter. If the output count of the pulse-driven pressure increase mode is less than the predetermined count Kz in step 439, and if the estimated vehicle velocity Vs is higher than 5 km/h in step 440, control remains in effect and step 443 is reached. If the output count of the pulse-driven pressure increase mode is not less than the count Kz in step 439, or if the estimated vehicle velocity Vs is not higher than 5 km/h in step 440, step 441 is reached where the motor 20 as well as the solenoid valves 31 through 38 are turned off to terminate anti-skid control. In step 442, the pressure decreasing timer, pressure holding timer and pressure increasing timer are all cleared, and the pulse-driven pressure increase counter is also cleared. Furthermore, the pulse-driven pressure increase flag, abrupt pressure decrease flag and pressure holding flag are all cleared to zero.

In steps 443 through 445, the same computing cycle of 3 to 5 ms as with the first embodiment is established. When the system timer has a count not more than a predetermined time T1, the timer is incremented in step 444. Upon elapse of the time T1, the system timer is cleared in step 445 before step 202 is reached again.

Figure 13:
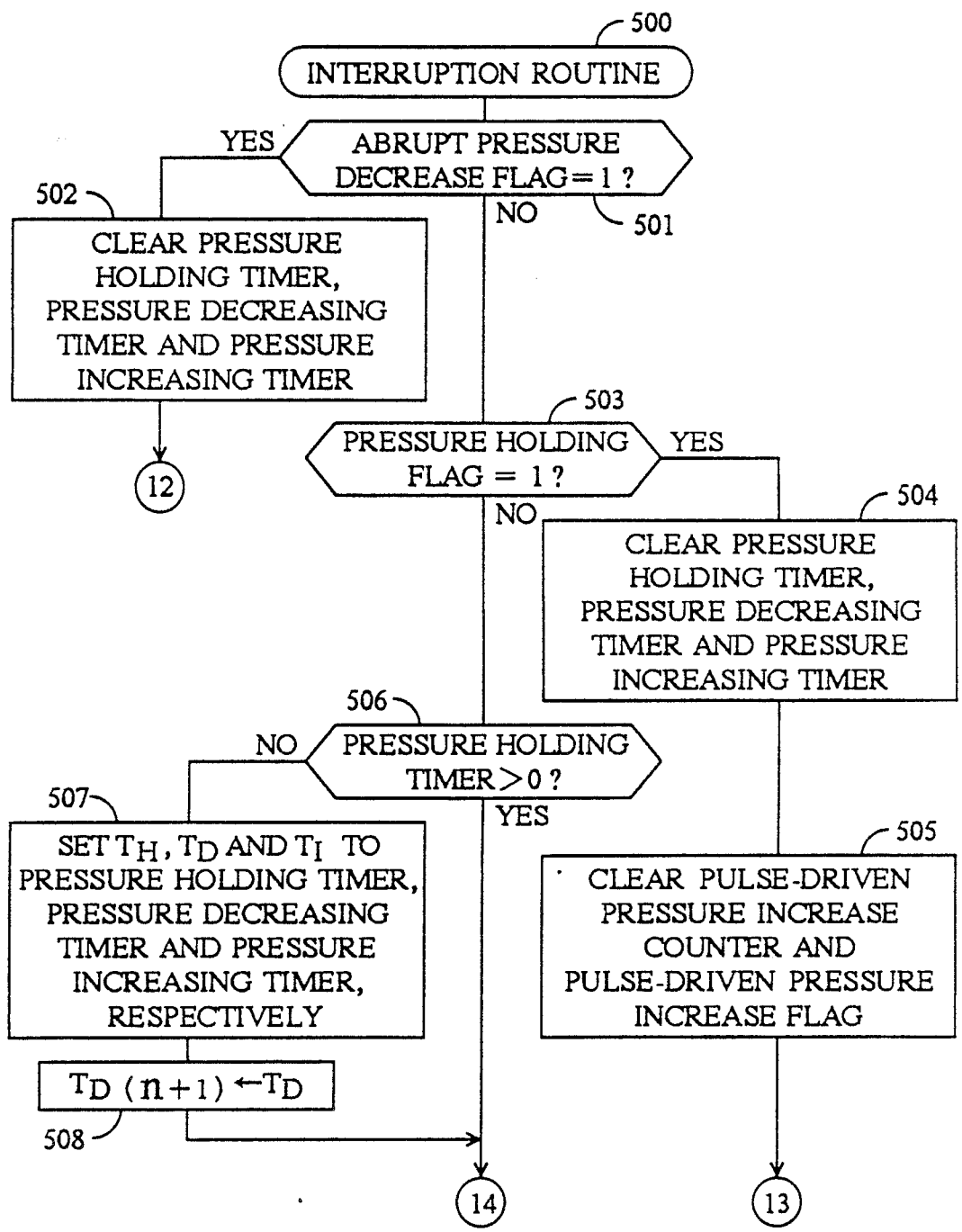
Figure 14:
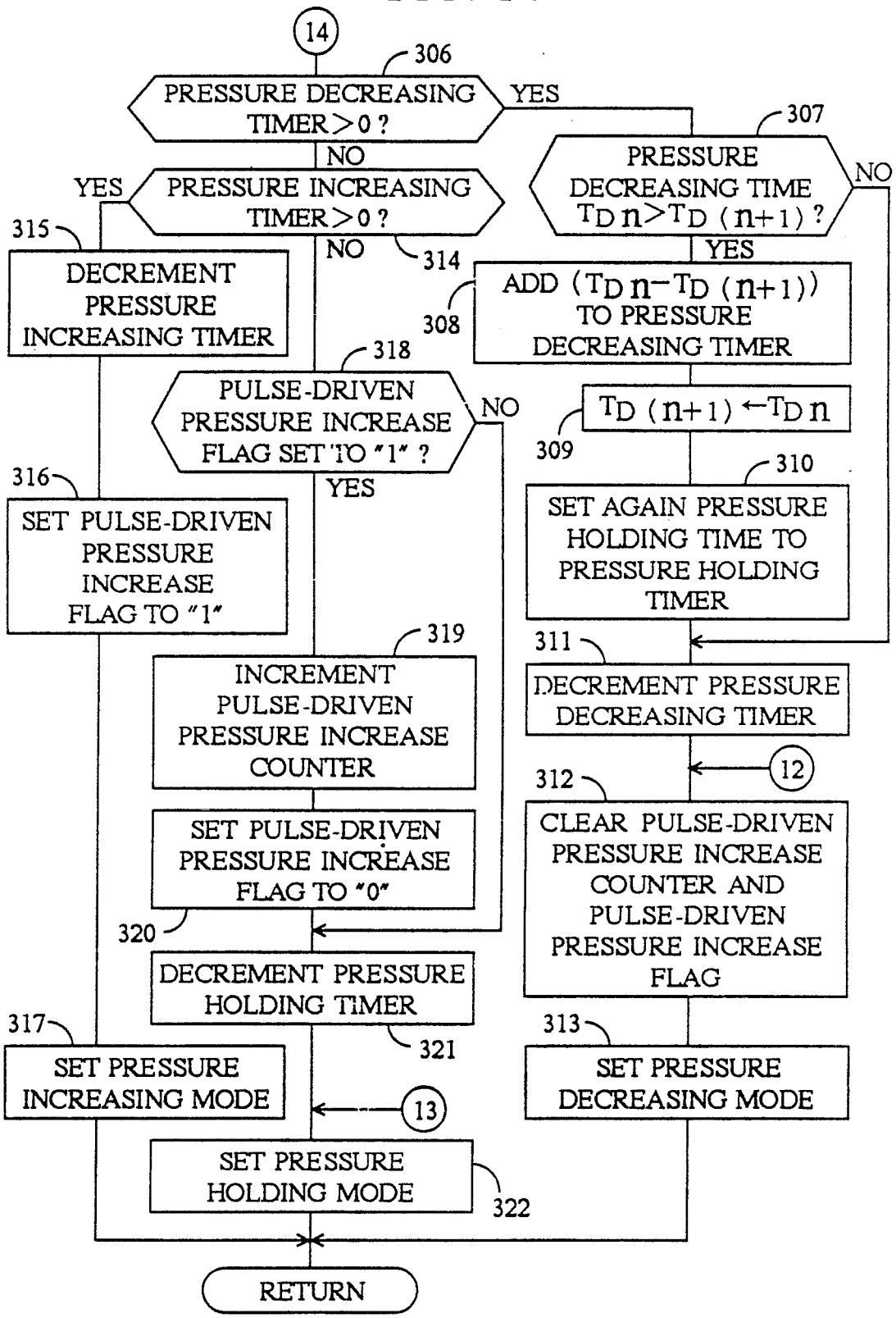

Steps 500 through 506 in FIG. 13 and steps 306 through 322 in FIG. 14 constitute a routine by which to interrupt the above-described processing at intervals of 1 ms. Steps 306 through 322 of FIG. 14 are substantially the same in content as the steps of FIG. 8, like steps being designated by like reference numerals, and are thus omitted from the description that follows.

In FIG. 13, a check is made in step 501 to see if the abrupt pressure decrease flag is set. If the flag is found to be set, step 502 is reached where the pressure holding timer, pressure decreasing timer and pressure increasing timer are all cleared to zero. Then step 312 of FIG. 14 is reached.

If the abrupt pressure decrease flag is not set in step 501 of FIG. 13, step 503 is reached where a check is made to see if the pressure holding flag is set. If the pressure holding flag is found to be set, step 504 is reached where the pressure holding timer, pressure decreasing timer and pressure increasing timer are all cleared, followed by step 505. In step 505, the pulse-driven pressure increase counter and pulse-driven pressure increase flag are cleared. Then step 322 of FIG. 14 is reached where the pressure holding mode is selected.

If the pressure holding flag is not set in step 503, step 506 is reached where a check is made to see if the pressure holding timer is set, i.e., if the count thereof is greater than 0. If the pressure holding timer is set, step 507 is reached where the above-computed pressure holding time $T_H$, pressure decreasing time $T_D$ and pressure increasing time $T_I$ are set to the pressure holding timer, pressure decreasing timer and pressure increasing timer, respectively. In step 508, the current pressure decreasing time $T_D$ is set as the next pressure decreasing time $T_{D(n+1)}$. Then step 306 of FIG. 14 is reached, as in the case where the pressure holding timer is not set. The subsequent processing is the same as depicted by the flowchart of FIG. 8.

In the pulse-driven pressure decrease mode of FIG. 16, the pressure decreasing time may be prolonged due to changes in the wheel lock level Lk or wheel acceleration DVw. In this case, steps 307 through 310 of FIG. 14 are carried out so that the prolonged time may be countered by the matching pressure decreasing action.

In this manner, the second embodiment of the invention suitably computes and establishes the pressure decreasing time in the pulse-driven pressure decrease mode or the pressure holding time in the pulse-driven pressure increasing mode in accordance with the correlation between wheel acceleration DVw and wheel lock level Lk. This in turn makes it possible to provide optimal time allocation settings that allow for the pressure increasing and decreasing characteristics of the pressure controlling means such as the solenoid valves 31 through 38.

Constructed as described above, the anti-skid controlling apparatus according to the invention suitably establishes the time allocation for the pressure decreasing time and decreased pressure holding time, as well as the time allocation for the pressure increasing time and increased pressure holding time, in accordance with the correlation between wheel acceleration DVw and wheel lock level Lk. The brake fluid pressure in the wheel cylinder is increased, held constant or decreased as needed. This makes it possible to establish optimal time allocation settings allowing for the pressure increasing and decreasing characteristics of the pressure controlling means. In turn, brake fluid pressure control is kept optimally provided independent of various factors that would affect the brake fluid pressure in the wheel cylinder. In this way, the anti-skid controlling apparatus is suitable for use on board diverse kinds of vehicle with diverse characteristics.

It is to be understood that while the invention has been described in conjunction with specific embodiments, it is evident that many alternatives, modifications and variations will become apparent to those skilled in the art in light of the foregoing description. Accordingly, it is intended that the present invention embrace all such alternatives, modifications and variations as fall within the spirit and scope of the appended claims.

What is claimed is:

1. An anti-skid controlling apparatus comprising:
   a wheel cylinder means which is attached to each of the wheels of a vehicle and which applies a braking force thereto;
   a wheel velocity detecting means for detecting a wheel velocity of said each wheel;
   a wheel acceleration computing means for computing a wheel acceleration based on said wheel velocity detected by said wheel velocity detecting means;
   an estimated vehicle velocity determining means for determining an estimated vehicle velocity based on said wheel velocity;

a wheel lock level determining means for determining a level of wheel lock based on said estimated vehicle velocity and on said wheel velocity;

a control allocation determining means for determining one kind of time allocation for a pressure increasing time and an increased pressure holding time, as well as another kind of time allocation for a pressure decreasing time and a decreased pressure holding time, said pressure increasing time being a period of time in which the brake fluid pressure in said wheel cylinder means is increased, said increased pressure holding time being a period of time in which said increased brake fluid pressure is maintained, said pressure decreasing time being a period of time in which said brake fluid pressure is decreased, said decreased pressure holding time being a period of time in which said decreased brake fluid pressure is maintained, said time allocation being based on the correlation between said wheel acceleration and said wheel lock level; and a pressure controlling means for controlling over time at least one of the increasing, holding and decreasing of said brake fluid pressure based on said time allocation for said pressure increasing time and said increased pressure holding time as well as on said time allocation for said pressure decreasing time and said decreased pressure holding time.

2. An anti-skid controlling apparatus according to claim 1, further comprising:

a slip ratio computing means for computing a slip ratio of said each wheel based on said estimated vehicle velocity and said wheel velocity; and a wheel velocity deviation computing means for computing a discrepancy in velocity between said estimated vehicle velocity and said wheel velocity;

wherein said wheel lock level determining means determines said wheel lock level based at least on one of said slip ratio and said velocity discrepancy.

3. An anti-skid controlling apparatus according to claim 2, wherein said wheel lock level determining means determines said wheel lock level by individually weighting said slip ratio and said velocity discrepancy and by adding up said weighted slip ratio and said weighted velocity discrepancy.

* * * * *